US009696856B2

(12) United States Patent
D'Souza

(10) Patent No.: US 9,696,856 B2
(45) Date of Patent: Jul. 4, 2017

(54) METHOD AND APPARATUS FOR DETECTING SIMULTANEOUS TOUCH EVENTS ON A BENDING-WAVE TOUCHSCREEN

(75) Inventor: Henry M. D'Souza, San Diego, CA (US)

(73) Assignee: ELO TOUCH SOLUTIONS, INC., Milpitas, CA (US)

(*) Notice: Subject to any disclaimer, the term of this patent is extended or adjusted under 35 U.S.C. 154(b) by 996 days.

(21) Appl. No.: 12/569,608

(22) Filed: Sep. 29, 2009

(65) Prior Publication Data

US 2011/0074544 A1    Mar. 31, 2011

(51) Int. Cl.
*G06F 3/043* (2006.01)
*G06F 3/041* (2006.01)

(52) U.S. Cl.
CPC .......... *G06F 3/0433* (2013.01); *G06F 3/0416* (2013.01)

(58) Field of Classification Search
USPC ........................................ 345/173, 174, 156
See application file for complete search history.

(56) References Cited

U.S. PATENT DOCUMENTS

| | | | |
|---|---|---|---|
| 3,134,099 A | 5/1964 | Woo | |
| 5,162,618 A | 11/1992 | Knowles | |
| 7,006,080 B2* | 2/2006 | Gettemy | ................ 345/175 |
| 7,157,649 B2 | 1/2007 | Hill | |
| 7,184,898 B2 | 2/2007 | Sullivan et al. | |
| 7,345,677 B2 | 3/2008 | Ing et al. | |
| 8,237,676 B2 | 8/2012 | Duheille et al. | |
| 8,239,784 B2* | 8/2012 | Hotelling et al. | ............ 715/830 |
| 8,378,974 B2 | 2/2013 | Aroyan et al. | |
| 8,392,486 B2 | 3/2013 | Ing | |
| 2003/0063073 A1 | 4/2003 | Geaghan et al. | |

(Continued)

FOREIGN PATENT DOCUMENTS

CN        1596412 A       3/2005
CN      101339478 A       1/2009

(Continued)

OTHER PUBLICATIONS

International Search Report for PCT/US2010/049043 (counterpart to ET-01023-US) mailed Jan. 25, 2011.

(Continued)

*Primary Examiner* — William Boddie
*Assistant Examiner* — Jeffrey A Parker
(74) *Attorney, Agent, or Firm* — Sterne, Kessler, Goldstein & Fox P.L.L.C.

(57) ABSTRACT

A method of detecting touch events on a touch panel includes identifying sets of coordinate locations based on at least one signal from at least one sensor. The at least one signal is responsive to at least one touch event, and the coordinate locations represent matches with respect to template fingerprints. Consecutive ones of the sets of coordinate locations are compared based on a first distance threshold to form streams of spatially continuous coordinate locations that satisfy the first distance threshold. A touch event is identified corresponding to one of the streams of spatially continuous coordinate locations, the stream having a minimum number of spatially continuous coordinate locations.

20 Claims, 8 Drawing Sheets

(56) References Cited

U.S. PATENT DOCUMENTS

| | | | |
|---|---|---|---|
| 2005/0083313 A1* | 4/2005 | Hardie-Bick | G06F 3/0433 345/177 |
| 2005/0174338 A1 | 8/2005 | Ing et al. | |
| 2006/0097991 A1* | 5/2006 | Hotelling et al. | 345/173 |
| 2006/0244732 A1 | 11/2006 | Geaghan | |
| 2007/0109279 A1 | 5/2007 | Sigona | |
| 2008/0048997 A1* | 2/2008 | Gillespie et al. | 345/174 |
| 2008/0136754 A1* | 6/2008 | Tsuzaki et al. | 345/84 |
| 2009/0009488 A1 | 1/2009 | D'Souza et al. | |
| 2009/0084612 A1 | 4/2009 | Mattice et al. | |
| 2009/0195517 A1 | 8/2009 | Duheille et al. | |
| 2009/0322699 A1* | 12/2009 | Hansson | 345/174 |
| 2011/0069018 A1* | 3/2011 | Atkins et al. | 345/173 |

FOREIGN PATENT DOCUMENTS

| | | |
|---|---|---|
| CN | 101339479 A | 1/2009 |
| GB | 2385125 A | 8/2003 |
| JP | H07-230352 A | 8/1995 |
| JP | 2005-529350 A | 9/2005 |
| JP | 2008-525808 A | 7/2008 |
| JP | 2009-015853 A | 1/2009 |
| JP | 2009-516285 A | 4/2009 |
| JP | 2009-181570 A | 8/2009 |
| WO | WO-00/38104 A1 | 6/2000 |
| WO | WO-01/43063 A1 | 6/2001 |
| WO | WO-03/067511 A2 | 8/2003 |
| WO | WO-2006/015888 A1 | 2/2006 |

OTHER PUBLICATIONS

Office Action directed to related Chinese Patent Application No. 201080043596.3, mailed Feb. 26, 2014; 12 pages.
International Preliminary Report on Patentability and Written Opinion for International Application No. PCT/US2010/049043, International Searching Authority, mailed on Apr. 12, 2012, 16 pages.
Second Office Action mailed Sep. 17, 2014, in related Chinese Patent Application No. 201080043596.3, with English translation, 14 pages.
Third Office Action mailed Mar. 16, 2015, in related Chinese Patent Application No. 201080043596.3, with English translation, 13 pages.

* cited by examiner

METHOD AND APPARATUS FOR DETECTING SIMULTANEOUS TOUCH EVENTS ON A BENDING-WAVE TOUCHSCREEN

BACKGROUND OF THE INVENTION

This invention relates generally to touch sensitive systems, and more particularly to identifying locations of two or more simultaneous touches on a touch sensitive system that uses bending-wave touch sensors.

Touch panels are used to provide two-dimensional coordinate information. One example may be an opaque track pad while another example may be a transparent touchscreen placed in front of a display such as a liquid crystal display. Touch panels may be based on a variety of touch technologies including four-wire and five-wire resistive, capacitive, infrared and surface acoustic wave types, as well as bending-wave touch technologies. One example of bending-wave touch technology are the products offered for sale by Elo TouchSystems, a business unit of Tyco Electronics, under the brand name "Acoustic Pulse Recognition" or more briefly "APR".

In one approach, bending-wave touch systems may detect a single touch based on a tap of an object, such as a key or finger, used to excite bending waves in a substrate. These bending waves induce electrical signals in piezoelectric elements or sensors (piezos) bonded to the substrate. These signals are captured by electronics and processed to determine a set of (X,Y) coordinates of the touch position, such as by using acoustic fingerprint methods to extract touch coordinate information from piezo signals.

Current applications using two-finger gestures such as zoom and rotate require multiple touches to be detected at the same time. Therefore, there remains a need for the detection of at least two simultaneous touches in bending-wave touch systems so that a user may interact with data being displayed, such as graphics and photos, or with programs such as when playing music. The ability to use two or more simultaneous touches would increase the interactive capability of the system. Bending-wave touch panels may be used in, but are not limited to, hand-held devices, desk top and portable computers, geographically fixed applications such as kiosks, large window applications, and the like.

BRIEF DESCRIPTION OF THE INVENTION

In accordance with an embodiment, a method of detecting touch events on a touch panel includes identifying sets of coordinate locations based on at least one signal from at least one sensor. The at least one signal is responsive to at least one touch event, and the coordinate locations represent matches with respect to template fingerprints. Consecutive ones of the sets of coordinate locations are compared based on a first distance threshold to form streams of spatially continuous coordinate locations that satisfy the first distance threshold. A touch event is identified corresponding to one of the streams of spatially continuous coordinate locations, the stream having a minimum number of spatially continuous coordinate locations.

In accordance with an embodiment, a touch system includes a touch panel, at least one sensor and a processor module. The at least one sensor obtains signals associated with at least one touch event on the touch panel. The processor module is configured to identify sets of coordinate locations based on the signals obtained over time. The coordinate locations represent matches with respect to template fingerprints. The processor module compares consecutive ones of the sets of coordinate locations based on a distance threshold to form streams of spatially continuous coordinate locations that satisfy the distance threshold. The processor module identifies at least one touch event when one of the streams of spatially continuous coordinate locations has a minimum number of spatially continuous coordinate locations.

In accordance with an embodiment, a method for detecting at least two simultaneous touch events on a touch panel includes detecting at least one signal from at least one sensor. At least two live fingerprints are constructed based on the at least one signal. A set of best matches is identified for each of the at least two live fingerprints based on a comparison of the at least two live fingerprints to template fingerprints. Simultaneous touch events are identified when at least two of the best matches associated with one of the live fingerprints satisfy redundant validation criteria with respect to at least two of the best matches associated with the other live fingerprint.

DETAILED DESCRIPTION OF THE INVENTION

Figure 1:
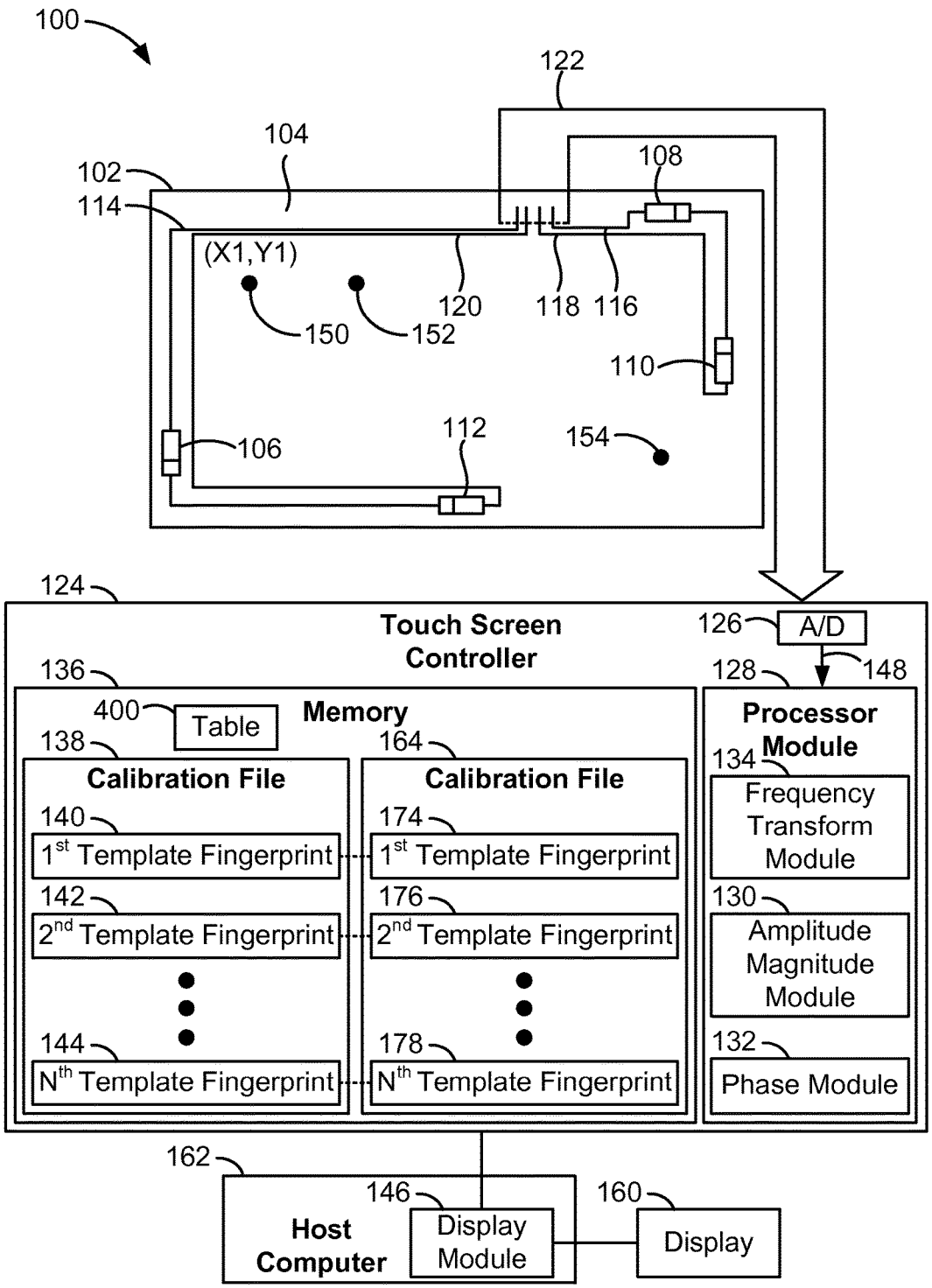
FIG. 1 illustrates an acoustic fingerprint based touch system formed in accordance with an embodiment of the present invention.

The foregoing summary, as well as the following detailed description of certain embodiments of the present invention, will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (e.g., processors or memories) may be implemented in a single piece of hardware (e.g., a general purpose signal processor or random access memory, hard disk, or the like). Similarly, the programs may be stand alone programs, may be incorporated as subroutines in an operating system, may be functions in an installed software package, and the like. It should be understood that the various embodiments are not limited to the arrangements and instrumentality shown in the drawings.

FIG. 1 illustrates an acoustic fingerprint based touch system 100. The acoustic fingerprint based touch system 100 is an example of a bending-wave touch system. In one embodiment, the acoustic fingerprint based touch system 100 is a system in which the bending waves are touch generated and detected in the audio frequency range of 0-20 kHz and/or the low ultrasonic frequency range well below 1 MHz.

Touch panel 102 has a substrate 104, such as a sheet of glass, aluminum or other material, upon which sensors 106, 108, 110 and 112 and associated traces 114, 116, 118 and 120 are mounted. The sensors may be piezoelectric sensors, which may be abbreviated as "piezo sensors" or simply "piezos". The sensors may also be any other type of sensor that detects local motion or strain of substrate 104 such as accelerometers and strain gauges of various types. The sensors 106-112 may also be referred to as microphones. The sensors 106, 108, 110 and 112 detect sound and transmit sensor signals along the traces 114, 116, 118 and 120 which interface with a touchscreen cable 122 to convey the sensor signals to a touchscreen controller 124. In the embodiment shown in FIG. 1, the voltage difference between traces 114 and 120 is one analog signal generated by the anti-series combination of sensors 106 and 112. Similarly, the anti-series combination of sensors 108 and 110 produces an analog signal corresponding to the voltage difference between traces 116 and 118. Alternatively, sensors 112 and 110 may optionally be removed such that each of sensors 106 and 108 corresponds to one analog signal. In another embodiment, one sensor may be used from which one signal is detected. In yet another embodiment, at least one sensor, such as a single sensor or two sensors combined in anti-series, may be used to generate at least one signal. In other embodiments, more than two analog signals are produced with either altered trace interconnections and/or additional sensors (not shown). It should be understood that the sensors 106, 108, 110 and 112 are not limited to the displayed placement with respect to the substrate 104 and/or each other, and that more or less sensors may be used to generate at least one signal that may be used to determine the positions of one touch or multiple simultaneous touches.

The touch panel 102, when used as a touchscreen, is formed of a non-opaque material such as glass and is mounted in front of a display 160 that may support a graphical user interface (GUI) displaying buttons and icons or other graphical representations. In other embodiments, the touch panel 102 may be formed of an opaque or non-opaque material and may be located physically separate from display 160, such as to function as a track pad. It should be understood that although the touch panel 102 is primarily referred to in the following discussion, other touch panel, touchscreen and track pad designs may similarly be used.

In general, the touch system 100 recognizes the sound created when the substrate 104 is touched at a given position that may be described as an (X,Y) coordinate location. It should be understood that other coordinate systems may be used, such as polar coordinates with a radius and angle about the origin. A touch event at each different position on the substrate 104 generates a unique sound. More specifically, when a user touches a point on the substrate 104, one or more sensors 106, 108, 110 and 112 on the substrate 104 detect the sound and represent the sound as a signal. Whether the touch panel is a transparent touchscreen or an opaque or non-opaque touchpad, the principles of acoustic fingerprinting remain the same. Ambient sound may also be detected by the sensors 106, 108, 110 and 112.

An analog to digital (A/D) converter 126 within the touchscreen controller 124 receives the two analog signals produced by sensors 106-112 over the touchscreen cable 122. In another embodiment, the A/D converter 126 may receive at least one analog signal from at least one sensor. The A/D converter 126 outputs digitized signals 148 that are received by a processor module 128. A frequency transform module 134 may perform a frequency transform, such as a Fourier transform, or more specifically a Fast Fourier Transform (FFT), on the digitized signals 148, outputting a frequency transform data set of frequency components associated with each of the sensor signals. In some embodiments, the frequency transform data set may be limited to a selected frequency range. An amplitude magnitude module 130 may then extract amplitude magnitude information from each of the frequency transform signals, and a phase module 132 may extract phase information from each of the frequency transform signals. The processor module 128 may construct a profile or acoustic fingerprint associated with the received sensor signals based on the amplitude magnitude information. In another embodiment, the processor module 128 may construct a profile or acoustic fingerprint associated with the received sensor signals that is based on both the amplitude magnitude information and the phase information. In yet other embodiments, the processor module 128 may construct the acoustic fingerprint based on the phase information or based on other information within the digitized signals 148. In another embodiment, the processor module 128 may construct the acoustic fingerprint based on information within the digitized signals 148 that are based on one signal or at least one signal. For example, for some applications it may be sufficient to use a time-domain signal shape or a normalized power spectrum from a single piezoelectric element to produce an acoustic fingerprint.

A memory 136 may store a calibration file 138 that contains a set of acoustic fingerprints to allow the user to successfully interact with the display 160. Prior to normal use, (X,Y) coordinate positions on the touch panel 102 are associated with the sensor signals that are generated when a series of known (X,Y) coordinate locations are touched. The signals may be processed and stored as acoustic fingerprints in the calibration file 138, such as first, second through $N^{th}$ template fingerprints 140, 142 and 144. In some embodiments, the signals may be processed differently to create a second calibration file 164 that is also stored in the memory 136 and contains a corresponding set of acoustic fingerprints. In this example, first, second through $N^{th}$ template fingerprints 174, 176 and 178 correspond to the first, second through $N^{th}$ template fingerprints 140, 142 and 144, respectively, and thus represent the same (X,Y) coordinate positions on the touch panel 102. One or both of the calibration files 138 and 164 may be used to detect the coordinate locations of touch events. It should be understood that additional calibration files may be used. In another embodiment, template fingerprints may be constructed "on the fly" by the processor module 128. For example, a new template fingerprint corresponding to an anticipated next touch location of a moving finger may be constructed by interpolating between stored template fingerprints corresponding to positions close to the anticipated next touch location.

In one embodiment, the first, second through $N^{th}$ template fingerprints 140, 142 and 144 may be based on magnitude ratios associated with two digitized signals as determined by the amplitude magnitude module 130, such as a ratio between the amplitude magnitudes of each of the two signals, or functions of the ratio. In another embodiment, the templates fingerprints 140, 142 and 144 may be based on phase difference information that may be determined by the phase module 132. In yet another embodiment, the template fingerprints 140, 142 and 144 may be based on magnitude ratios in combination with phase information. It should be understood that the template fingerprints 140, 142 and 144 may be based on other measurements, comparisons of signals, and combinations thereof.

By way of example, the calibration file 138 may be constructed by tapping the touch panel 102 at a series of known calibration points to generate the first, second through $N^{th}$ template fingerprints 140, 142, and 144. In one embodiment, N may be equal to approximately 4000, but it should be understood that other numbers of template fingerprints may be generated, such as based on the size of the touch panel 102, the GUI interfaces to be used, and the like.

In the context of bending-wave touchscreen technology, acoustic fingerprints may also be referred to as fingerprints, profiles, or templates. By way of example, a touch event at location 150 may correspond to the first template fingerprint 140, while touch events at locations 152 and 154 may correspond to the second and $N^{th}$ template fingerprints 142 and 144, respectively. The calibration file 138 therefore includes a plurality or collection of predetermined fingerprints or templates, each of which is associated with a particular (X,Y) location on the touch panel 102. As used herein, the term "template" may be used to refer either to a predetermined fingerprint in a calibration file or to a "template" generated by the processor module 128 on the fly. In contrast, a live acoustic fingerprint computed for a run-time touch is referred to herein as a "live fingerprint" or a "real-time fingerprint". It should be noted that a live fingerprint may or may not represent an actual touch on the touch panel 102, as the live fingerprint represents the sensor signals detected in each frame when the touch system 100 is active.

As used herein, "simultaneous touch events" refers to two or more touches that are present during a same time duration but are not necessarily synchronized. Therefore, one touch event may have a duration that starts before the beginning of the duration of another touch event, such as a second touch event, and at least portions of the durations of the first and second touch events overlap each other in time. For example, two or more simultaneous touch events occur when objects such as a finger or stylus makes contact with the touch panel 102 in two or more distinct locations, such as at two or more of the locations 150, 152 and 154, over a same time duration.

During operation, the processor module 128 compares the live fingerprint constructed based on the detected signals to at least a subset of the first, second through $N^{th}$ template fingerprints 140, 142 and 144 stored in the calibration file 138. One or more "best matches" may be determined, for example, by determining a score or a scoring relation for each comparison with the processor module 128. The score represents how different, or how closely matched, the live fingerprint is with respect to each of the first through $N^{th}$ template fingerprints 140-144 in the calibration file 138. As used herein, a "best match" refers to the closest matching comparison, which may also be referred to as the match that has the highest degree of correlation. When calculating the score or degree of correlation, a perfect match may correspond to either a minimum or a maximum number within an associated scale. In one embodiment, the score may be a sum of the absolute differences over the detected frequency range. There may also be multiple "best matches", wherein the top M matching comparisons are identified, such as by identifying a predetermined number of the template fingerprints that are the most similar to the live fingerprint. When the processor module 128 is trying to identify an initial or first live touch, if the best matching template fingerprint meets the criteria of a single touch, such as by having a score below or above a predetermined threshold, the template fingerprint may then be used to identify the location of an initial touch event, which may also be referred to herein as a primary touch.

As will be known by one skilled in the art, the definition of the score can be offset and rescaled in various ways with no material effect as long as associated threshold conditions are modified accordingly. The underlying concept is that a score provides a measure of the degree of correlation between two acoustic fingerprints. For clarity of presentation, embodiments below are presented for the specific case that the score is defined in such a way as to be proportional to the degree of correlation. Other embodiments with alternate score definitions are implied through straight-forward algorithm modifications via all possible rescalings and offsets of the score definition. Note that a score S' defined as a sum of the absolute differences over the detected frequency range is not proportional to the degree of correlation. For a perfect match S' is zero, for complete anti-correlation S' has a mathematically maximum possible value of S'max and for no correlation, such as between two random acoustic fingerprints, S' has the value of S'max/2. S' can be offset and rescaled as the score S=C*(S'max/2−S'). The score S is proportional to the degree of correlation as it has a maximum value for a perfect match (corresponding to a high degree of correlation) and a value of zero for no correlation (corresponding to a low degree of correlation). The constant C may be chosen, for example, to set the score value for a perfect match to a convenient value for integer arithmetic such as 1024. Again, for clarity of presentation, the embodiments below will be described primarily in terms of a score such as S having a value that is proportional to the degree of correlation, that is, a score that is better may have a larger value and a higher degree of correlation compared to a score that is comparatively worse, which may have a smaller value and a lower degree of correlation.

When a primary touch is identified, the processor module 128 may then pass the (X,Y) coordinates associated with the template fingerprint to a display module 146 that may be stored within one or more modules of firmware or software. The display module 146 may be a graphical user interface (GUI) module such as the Microsoft Windows® operating system, for example. In one embodiment, the display module 146 is run on a host computer 162 that also runs an application code of interest to the user. In one embodiment, the display module 146 may use the calibration file 138 of template fingerprints with a matching algorithm to identify the coordinate locations of live signals resulting from touch events. The display module 146 determines whether the coordinates indicate a selection of a button or icon displayed on the display 160. If a button is selected, the host computer 162 or other component(s) (not shown) may take further action based on the functionality associated with the particular button.

In multiple touch situations, however, such as when two touch events are simultaneously present, choosing the top two best matching template fingerprints does not always produce the correct coordinate locations of the two touches. Furthermore, a second or subsequent live touch may not generate a best match with a template fingerprint that meets the criteria for a live touch.

Figure 2:
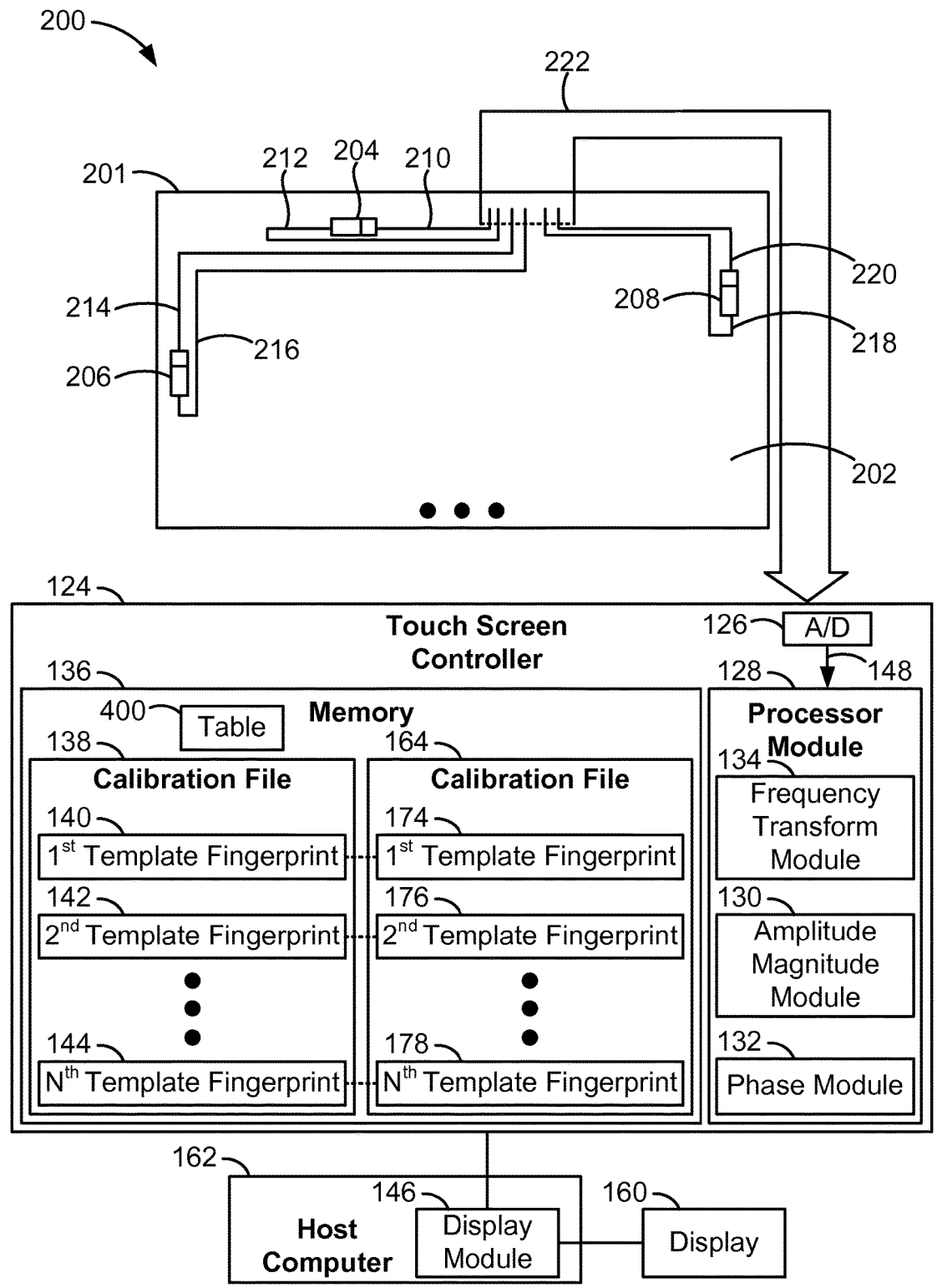
FIG. 2 illustrates another acoustic fingerprint based touch system formed in accordance with an embodiment of the present invention.

FIG. 2 illustrates an acoustic fingerprint based touch system 200 having a touch panel 201 that includes at least one sensor that generates at least one signal that is used for touch detection. In one embodiment, at least three signals may be detected from at least three sensors. The touch panel 201 has a substrate 202 upon which first, second, and third sensors 204, 206 and 208 are mounted. In FIG. 2, a single sensor 204, 206 and 208 is used to produce a signal rather than a pair of piezos or microphones interconnected in anti-series (as shown on FIG. 1). Traces 210 and 212 convey a first signal associated with the first sensor 204, traces 214 and 216 convey a second signal associated with the second sensor 206, and traces 218 and 220 convey a third signal associated with the third sensor 208. Cable 222 carries the signals to the touchscreen controller 124 as discussed previously in FIG. 1. More than three sensors may be used to produce additional signals. The elements within the touchscreen controller 124, display 160 and host computer 162 of FIG. 1 are reproduced in connection with the touch system 200.

As shown in FIG. 2, at least one signal received within the same time period may be used to construct one, two or more acoustic fingerprints. In one embodiment, more than two signals may be received from which one or more acoustic fingerprints are constructed. The acoustic fingerprints may be constructed based on phase-difference, magnitude ratio, a different construction, and/or a combination thereof. If more than one acoustic fingerprint is constructed from the signals detected within a single frame of data, the benefits of redundant validation may be realized. Redundant validation may be used to provide robust touch point detection in all sizes of touchscreens and especially for smaller-sized touchscreens and touchscreens used in noisy environments. The use of redundant validation to identify coordinate locations of multiple simultaneous touch events is discussed further below.

Figure 3:
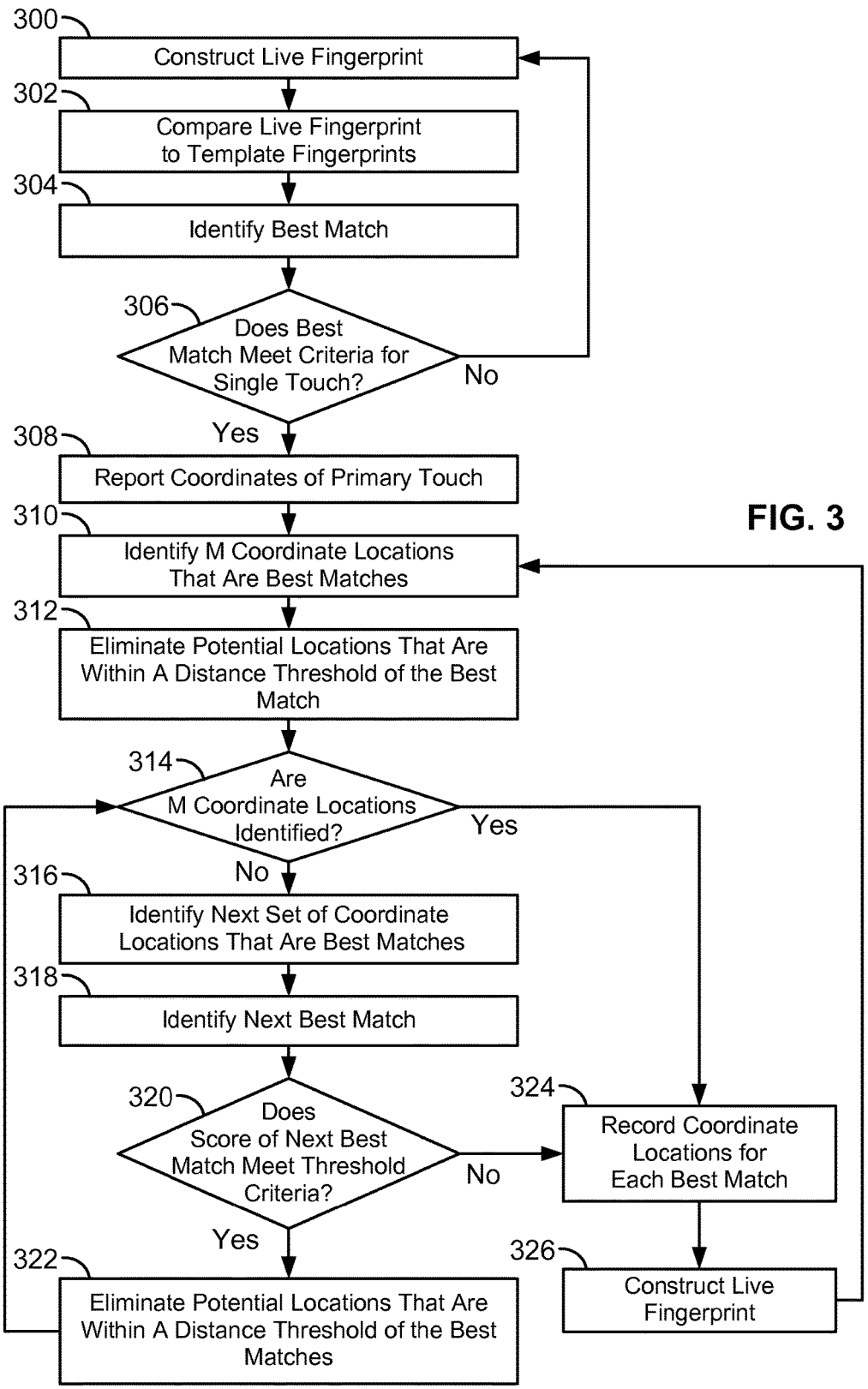
FIG. 3 illustrates a method for identifying potential simultaneous touch events in accordance with an embodiment of the present invention.

FIG. 3 illustrates a method for identifying two or more simultaneous touch events. At 300, no touch event has been identified and the processor module 128 may construct a live fingerprint based on, for example, the phase difference and/or magnitude ratio calculated based on the signals sensed from the sensors 106-112 of FIG. 1. In one embodiment, the processor module 128 constructs a new live fingerprint for each frame of data detected. A new frame of data may be detected every 23 milliseconds (ms), for example. The processing method that is used to acquire the live fingerprint is the same method that was used to build the template fingerprints 140-144 in the calibration file 138 that is used for comparison.

At 302, the processor module 128 compares the live fingerprint to the template fingerprints, such as the first through $N^{th}$ template fingerprints 140-144 stored in the calibration file 138, to determine differences there-between. At 304 the processor module 128 identifies the best match, such as by determining which of the matches has the best correlation or highest degree of correlation, as discussed previously. In another embodiment, the best match may be determined based on which of the matches has the lowest or highest score, depending on the scoring method used.

At 306 the processor module 128 determines whether the best match meets the criteria of an actual touch event. In one embodiment, the criteria may be a predetermined score that represents a minimum or maximum acceptable score. In another embodiment, the criteria may be a degree of correlation. If the best match is not determined to be a live touch event, the method may return to 300. If the best match is determined to be a live touch event, at 308 the processor module 128 reports the coordinates of the best match to the operating system with no delay. The best match here is associated with an initial or primary touch. As used herein, the term "primary touch" indicates the first touch location or first touch event. In some embodiments, the primary touch may be the only touch detected by the system 100 for a period of time. For example, in some multiple touch applications the user may touch a first location slightly sooner in time than the second location.

At 310, the processor module 128 identifies M template fingerprints that are a "best match" with respect to the live fingerprint. Each of the best matches has a coordinate location identified by the template fingerprints, and thus a set of coordinate locations is identified. As discussed above, the processor module 128 may determine the scores or the highest degrees of correlation that indicate M possible candidate positions or best matching template fingerprints.

As used herein, M is an integer that may be defined to be a constant or a variable, or may be defined based on an active application. For example, M may be five, six, seven, eight or more. In another embodiment, M may be based on an expected number of simultaneous touch events. For example, if the application being used accepts up to two simultaneous touch events, M may be six, while if the application accepts up to three simultaneous touch events, M may be larger, such as eight. M may also be dynamically adjustable, wherein as more simultaneous touch events are detected, M increases.

Phantom or spurious points may appear within the best matches that are not a result of a touch event. Also, a touch event may generate two or more best matches that are very close to each other on the touch panel 102. Therefore, at 312 the processor module 128 eliminates potential coordinate locations that have been identified as "best matches" that are within a distance threshold of the best match identified at 304. In other words, the processor module 128 identifies a local maximum. In one embodiment, the distance threshold may be approximately 24 millimeters, a half inch, or three grid points, such as a square or circle with the best match located at the center. Other shapes and distances may be used.

At 314 the processor module 128 determines if M coordinate locations are still identified. For example, if any of the best matches were eliminated at 312, then M coordinate locations have not been identified and the method passes to 316. At 316 the processor module 128 determines a next set of coordinate locations that are best matches, based on, for example, the scores assigned to the template fingerprints based on the comparison at 302. In one embodiment, the processor module 128 may identify an additional M coordinate locations or other number of coordinate locations. In another embodiment, the processor module 128 may identify additional coordinate locations up to a total of M, wherein M includes the already identified best match(es).

At 318 the processor module 128 may identify the next best match, which in this iteration would be the match with the second highest score or next highest degree of correlation. At 320 the processor module 128 determines whether the score of the next best match meets a threshold criteria. For example, some candidates may be disqualified based on, for example, a score that is too low or too high, or a degree of correlation that is too low. If the score does not meet the threshold criteria, the method passes to 324 as the next best match does not represent a possible touch event and it is not necessary to look at any more candidates within the current frame of data. If the score meets the threshold criteria, the method passes to 322.

At 322 the processor module 128 eliminates the potential coordinate locations that are within the distance threshold of the identified best match(es). This includes comparing newly identified best matches with all of the previously identified best matches.

The method returns to 314 where the processor module 128 determines if M coordinate locations are identified. If not, the method passes to 316 to identify more potential coordinate locations. If M coordinate locations are identified at 314, the method passes to 324 where the processor module 128 records each of the M coordinate locations in order to start a potential stream of data for each of the coordinate locations that may represent a touch event. It should be noted that there may be less than M coordinate locations recorded if the method has passed from 320, indicating that the next best matches do not have a high enough degree of correlation to be considered a possible touch event.

Figure 4A:
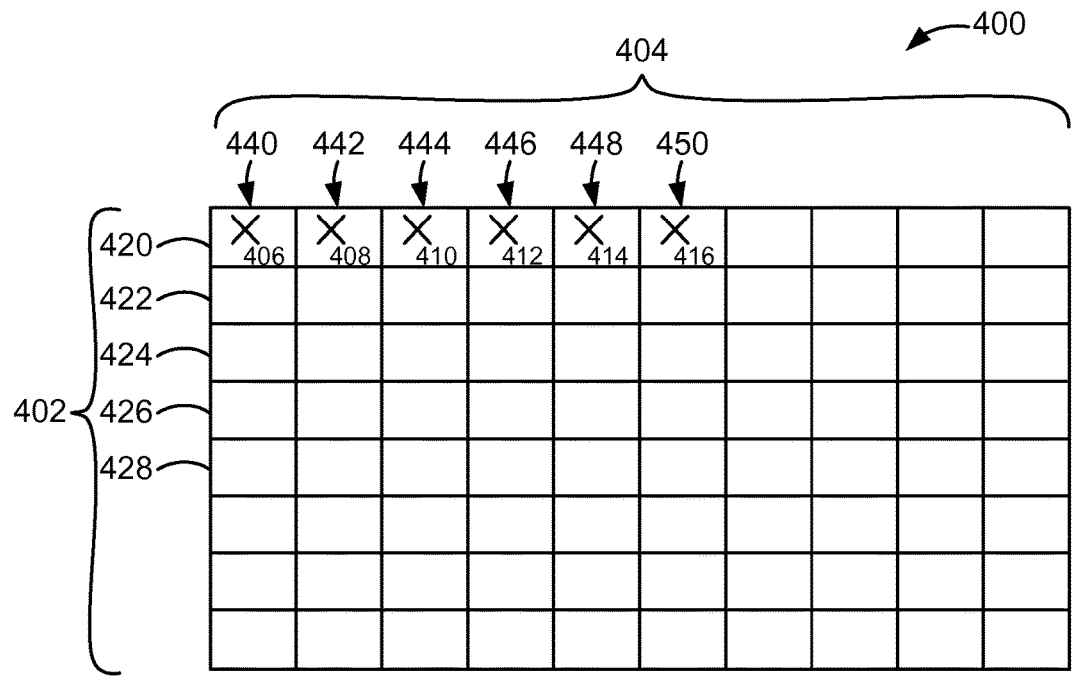
FIGS. 4A, 4B and 4C illustrate a best match table wherein data related to potential touch events are stored based on positional continuity in accordance with an embodiment of the present invention.

FIG. 4A illustrates a best match table 400 wherein the best matches are stored, such as within the memory 136 of FIGS. 1 and 2. Although the table 400 is represented having rows 402 and columns 404 for discussion purposes, it should be understood that the data may electronically be stored and associated in other formats, such as within different non-contiguous memory locations within the memory 136. The processor module 128 may build the table 400 by writing a set of best matches, which may be the set of M coordinate locations that are associated with the first frame of data, into a first row 420. Information recorded may include at least the associated coordinate location and the score. In one embodiment, the first frame of data refers to the frame of data in which the first touch event or primary touch is identified, and the set of M coordinate locations may be referred to as an initial set of M coordinate locations. For example, at location 406 the processor module 128 may write the best match identified at 304 of FIG. 3, which corresponds to the first touch event, at location 408 the processor module 128 may write the next best match, and so on. The remaining best matches may be recorded in locations 410, 412, 414 and 416. In this example, M is equal to six, and an "X" is indicated within the locations where data is recorded. As discussed previously, M may be a different number, such as eight. The data written to the first row 420 seeds potential streams 440, 442, 444, 446, 448 and 450 of coordinate locations that may each indicate a touch event. Subsequent sets of M best matches that are identified may be recorded in subsequent rows, such as rows 422, 424, 426 and 428, based on proximity or distance criteria as discussed further below.

Returning to FIG. 3, at 326 the processor module 128 constructs a new live fingerprint based on the next acquired frame of data. The method then returns to 310 to identify the next set of M coordinate locations that are the best matches. In this iteration, however, once the M coordinate locations are identified at 314 or the coordinate locations that meet the threshold criteria have been identified at 320, the processor module 128 compares each of the newly identified coordinate locations to the previous set of coordinate locations, such as the coordinate locations stored in locations 406-416.

Figure 4B:
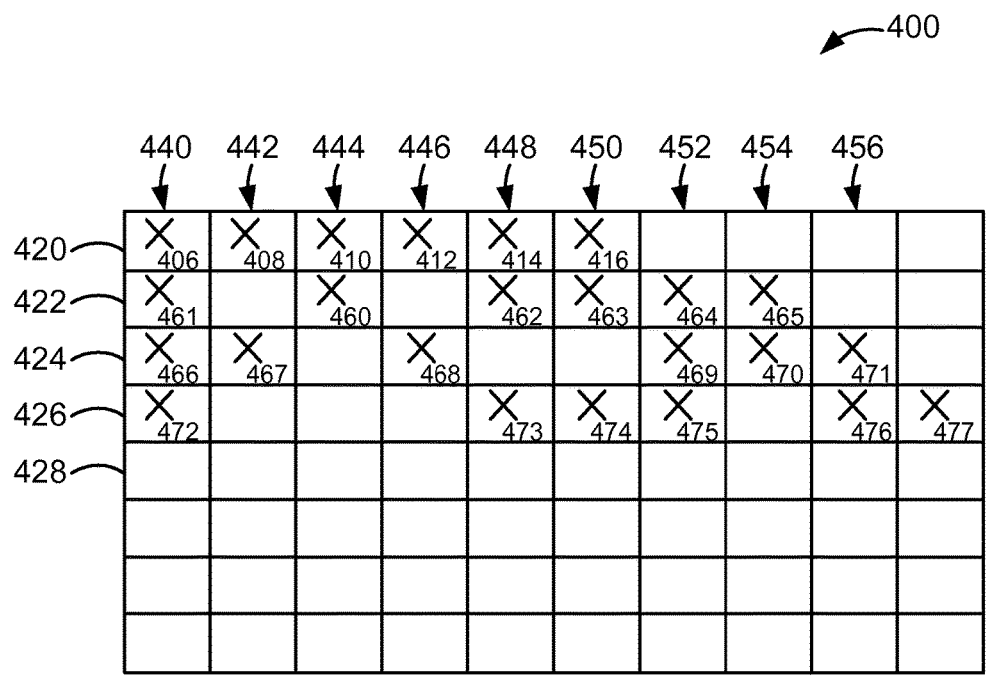

FIG. 4B illustrates the best match table 400 wherein subsequent sets of M potential coordinate locations have been added. The table 400 is built by adding rows of data based on score and spatial continuity. For example, the entries with the best scores are each added to a column based on spatial continuity, that is, entries that occur within a predetermined distance threshold (i.e. proximity threshold) of a previous entry are assigned to the corresponding stream. Turning first to the row 422, a second set of M coordinate locations is identified at 314 of FIG. 3. The second or next set of coordinate locations may be identified in the next frame or clock cycle in time. In other embodiments one or more frames may be deleted, such as every other frame, and thus the second or next set of coordinate locations may be identified based on the order in time. Therefore, as used herein, "consecutive" indicates that one set of coordinates comes after the previous set of coordinates in time, and is not limited to occurring immediately in time after the previous set. Again, M is equal to six. When multiple touches are present, the primary touch will appear in the top M matches of at least one frame of data within a predetermined time period or number of consecutive frames as discussed further below, but the primary touch may not have the best score.

Each of the M coordinate locations are compared to the coordinate locations recorded in row 420. If a new coordinate location is within a distance threshold of a previously recorded coordinate location, the data is recorded within the same stream, such as below the coordinate location in the table 400. This comparison enforces positional continuity on the streams, forming streams of spatially continuous coordinate locations. In one embodiment, the distance threshold may be approximately 12 millimeters, a half inch, or three grid points. Other distances may be used.

For example, the very best match may be recorded in location 460, which is associated with location 410 and stream 444. The next best match may be recorded in location 461, which is associated with location 406 and stream 440, the next best match may be recorded in location 462, which is associated with location 414 and stream 448, and the next best match may be recorded in location 463, which is associated with location 416 and stream 450. However, the remaining two best matches may not fit the distance criteria of any of the coordinate locations recorded in locations 406-416. Therefore, the fifth and sixth best matches are recorded in locations 464 and 465, seeding new streams 452 and 454, respectively.

When a third set of M coordinate locations is identified at 314 of FIG. 3, the data is added to the table 400 in the same manner. Row 424 reflects a third set of M potential coordinate locations that have been entered into locations 466, 467, 468, 469, 470 and 471. Row 426 reflects a fourth set of M potential coordinate locations that have been entered into locations 472, 473, 474, 475, 476 and 477. One characteristic of a valid touch event is that the coordinate locations will appear in the top M coordinate locations at least periodically and create a stream of spatially continuous coordinate locations. Therefore, in some embodiments a stream may not have entries based on each clock cycle or other sampling period. When a stream includes a predetermined number of entries, such that a potential event was detected within the predetermined distance criteria over a period of time, such as over three frames of data as seen in the stream 452 (stream 440 is representative of the primary touch in this example), the processor module 128 determines whether the data indicates a second touch event on the touch panel 102.

Spurious data that does not correspond to a valid touch may also be detected within the M coordinate locations or M best matches. In one embodiment, streams may be "killed", i.e. eliminated or deleted, if no entries are made within the stream for a predetermined period of time. For example, the parameter for eliminating a stream may be set to a single frame of data. Therefore, streams 442 and 446 may have been eliminated based on this criteria, as no data is entered in streams 442 and 446 in row 422.

However, when more than one simultaneous touch is present on the substrate 104, the score or degree of correlation may degrade compared to degrees of correlation determined with a single touch. Therefore, a predetermined number of frames may be identified after which, if no data is entered in a stream, the stream is eliminated. In one embodiment, the processor module 128 may eliminate a stream after three consecutive empty frames are detected, allowing a new stream of data to be seeded and followed within those memory locations of the memory 136.

Figure 4C:
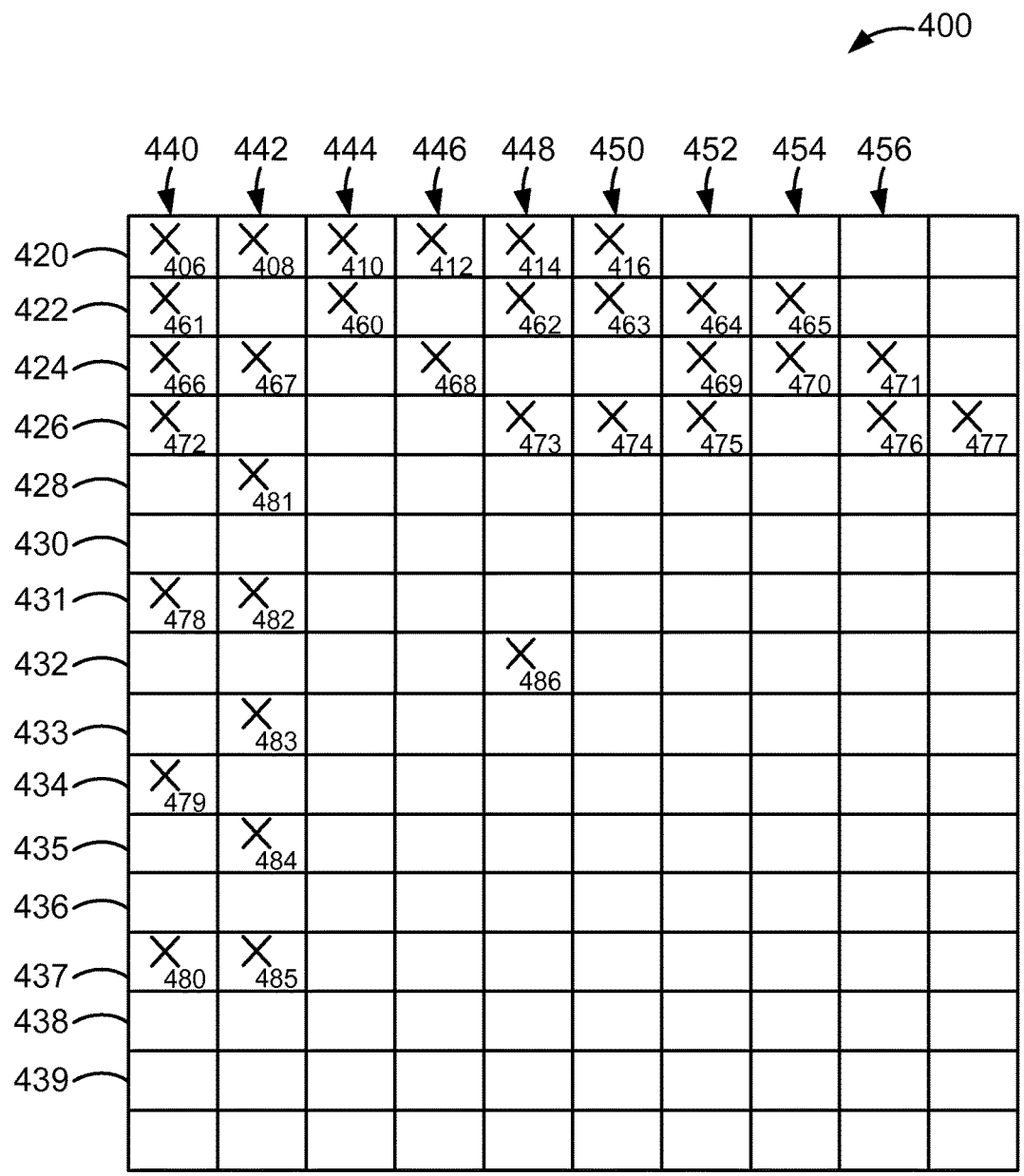

Therefore, in some embodiments, a valid touch event may have positional continuity but not appear in the top M coordinate locations of every consecutively acquired frame. FIG. 4C illustrates the table 400 having additional consecutively acquired rows 430, 431, 432, 433, 434, 435, 436, 437, 438 and 439 for holding data based on sequential frames of data. In the example of FIG. 4C, not all of the M best matches are recorded in the table 400. Also, in the following examples of FIG. 4C, a stream is considered to be a potential touch event if at least six spatially continuous coordinate locations are detected and no more than two empty frames are detected between two recorded locations. Therefore, a stream is not limited to consecutive entries.

Turning to the stream 440, this stream has recorded best matches in the locations 478, 479 and 480 of rows 431, 434, and 437. As discussed previously, the stream 440 was a result of the primary touch being detected. Also, it is possible for a touch event to remain active on the substrate 104 and not be detected within each frame of data. In one embodiment, as long as a touch event is detected at least every third frame, the touch event is valid. For example, stream 440 does not have entries in rows 428 and 430. With the entry at location 478, however, the stream 440 is kept alive. Subsequent entries at locations 479 and 480 are also detected within the time constraints. It should be understood that other tolerances may be used, such as detecting an entry within four or more frames.

Stream 442 illustrates another example of qualifying a stream and identifying a potential coordinate location based on spatial continuity acquired over a time. For example, after a sixth event in location 484 is recorded, even though each of the locations 408, 467, 481, 482, 483, 484 and 485 are separated by an empty frame, the processor module 128 may determine that stream 442 represents a potential touch location. Each empty single frame is within the parameters wherein a stream is considered to be viable. In another embodiment, the processor module 128 may identify the stream 442 after more or less than six spatially continuous coordinate locations have been detected.

In another example, if each entry is detected at the maximum time constraints, such that an entry is made within the stream only every third frame, the processor module 128 may take up to sixteen frames to recognize a potential touch event. In some embodiments, the number of spatially continuous coordinate locations needed may depend at least in part on an acceptable response time for recognizing the second touch point. For example, evaluating the stream of a potential second touch point after sixteen consecutive data frames may result in a long delay, depending on the time elapsed between the data frames. Therefore, a lower number of spatially continuous coordinate locations may be used.

Turning to the elimination of spurious streams, as discussed previously, if no entries are made within the stream for a predetermined number of consecutive frames, such as three consecutive frames, the processor module 128 may eliminate that stream, allowing a new stream of data to be seeded and followed within those memory locations of the memory 136. For example, stream 448 had detected data at locations 414, 462 and 473 within data frames corresponding to the rows 420, 422 and 426, respectively. In one embodiment, if the processor module 128 identifies potential matches after three spatially continuous coordinate locations, the stream 448 may be identified as a potential touch event. As shown, no corresponding best match is detected within the three following data frames corresponding to rows 428, 430 and 431. Therefore, the processor module 128 may kill the current stream 448 and release the memory locations to record other best matches. Therefore, in the next frame corresponding to row 432, the processor module 128 may record location 486, which represents a newly created stream that is spatially different from the previous stream that was based on locations 414, 462 and 473.

Therefore, by eliminating streams that are not active the data associated with the table 400 can be contained within a predetermined size limit. In one embodiment, the size of the table 400 may be configured to accommodate up to sixteen streams, wherein each stream is represented by a column and fourteen rows. Likewise, streams that corresponded to live touches but are no longer recording data indicating that the touch is still active may be eliminated. In some embodiments, previously recorded data may be kept for a predetermined period of time or frames before being deleted.

It should be understood that the stream-building methods discussed with respect to FIGS. 3 and 4A-4C may also be applied to detect single touch events. For example, the processor module 128 may identify the M coordinate locations before any touch event, such as the primary touch, has been detected. In some embodiments, stream-building may be used to detect single touch events, such as in environments that experience levels of ambient noise that may interfere with other types of single touch detection methods.

Figure 5:
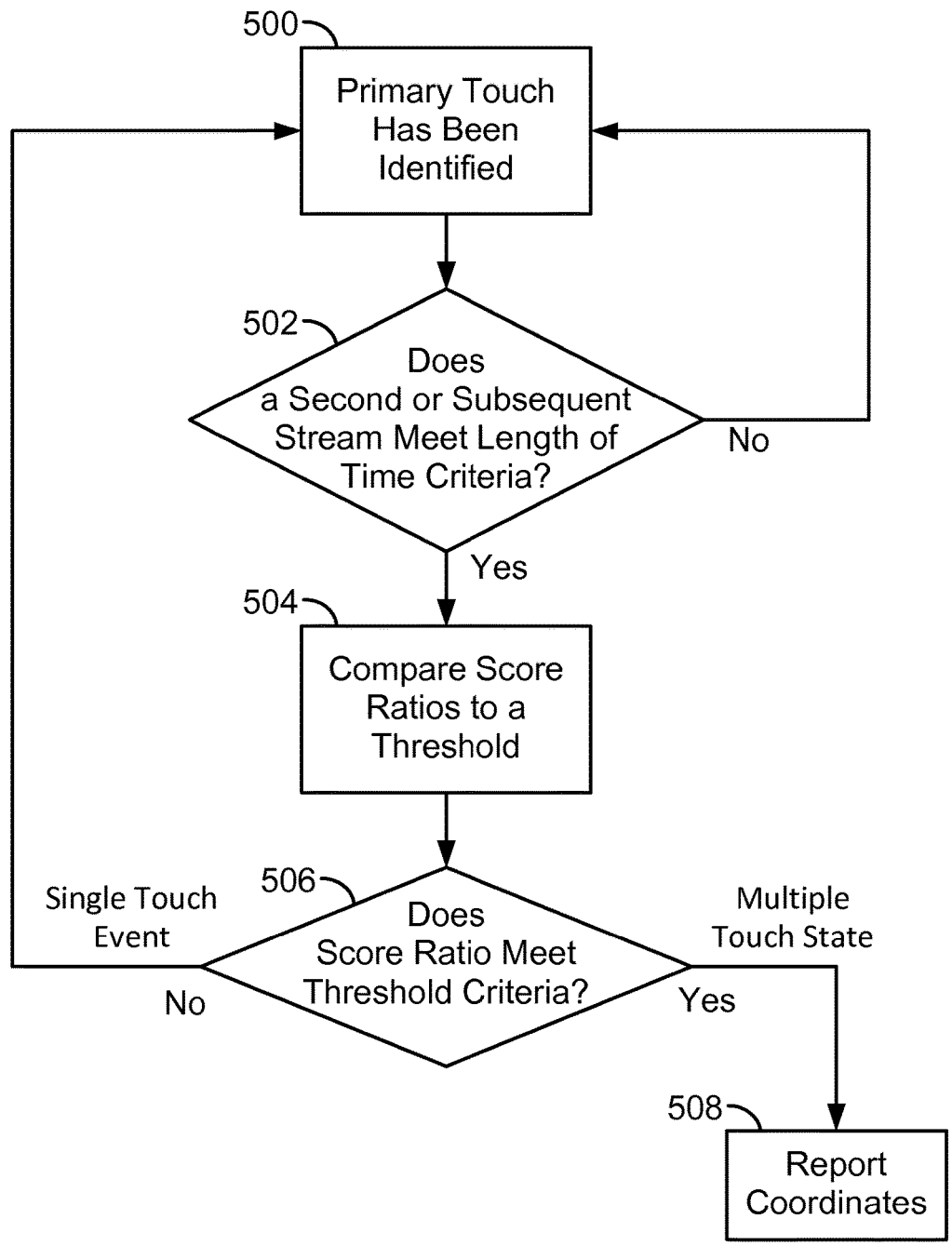
FIG. 5 illustrates a method for determining whether two or more simultaneous touch events are occurring in accordance with an embodiment of the present invention.

FIG. 5 is a method for determining whether two or more simultaneous touches are occurring. When multiple touches are occurring, one or more scores may not meet the requirements used to determine a single touch state. Therefore, several other criteria are considered when identifying multiple touches. At 500, the processor module 128 has already detected and reported the primary touch to the operating system, such as in 304-308 of FIG. 3. The primary touch has an associated stream, in this example, stream 440. As shown in FIG. 4B, the stream 440 has valid entries in rows 420, 422, 424 and 426 which meet the minimum criteria of score, degree of correlation, and/or spatial continuity, and thus is still considered a valid touch. The method of FIG. 5 may start after a minimum number of frames have been processed, or may be run anytime coordinate locations are recorded (324 of FIG. 3). Therefore, the methods of FIGS. 3 and 5 may run concurrently.

At 502 the processor module 128 determines if there is a second stream that may indicate that a second touch is present on the touch panel 102. Although only a second stream is discussed, it should be understood that more than two additional streams may be identified and evaluated as discussed below. As discussed previously, a time period, such as over a predetermined number of image frames, may be used to determine if the stream has existed for a long enough period of time to be considered as a touch event candidate. In the example of FIG. 4B, three spatially continuous coordinate locations are used as the length of time criteria, and a stream is eliminated if a single frame of data is not detected within the stream. Other parameters may be used, as discussed with respect to FIG. 4C. If no stream meets the length of time criteria, the method returns to 500. Referring to FIG. 4B, stream 442 has entries in rows 420 and 424, and thus does not meet the criteria of at least three spatially continuous coordinate locations. Therefore, the entries in locations 408 and 467 may have resulted from spurious noise. The streams 444, 446, 448, 450, 454, and 456 also do not have an acceptable continuity of time. The stream 452, however, does meet the length of time criteria as data has been entered in locations 464, 469 and 475 over three consecutive image frames.

At 504 the processor module 128 compares the average stream scores of the primary touch and the potential subsequent touch to each other. This is accomplished for each of the potential subsequent touches. In one embodiment, the scores of the primary touch may be averaged over the length of time acquired. For example, the scores recorded in locations 406, 461, 466 and 472 would be averaged. Likewise, the scores of a potential subsequent touch, such as those recorded in locations 464, 469 and 475 would be averaged. In some embodiments, the primary touch may have a better average score than a subsequent touch. As discussed previously, a better average score may be a lower score number while in other embodiments a better average score may be a higher score number. In other embodiments, an average degree of correlation may be determined.

At 506 the processor module 128 determines whether the average scores of the primary touch and the potential subsequent touch are similar enough to each other. In one embodiment, differences in scores between the primary touch and potential subsequent touch may be determined; and if the score difference is less than a predetermined threshold, the scores may be deemed "similar". In another embodiment, the processor module 128 may compare the score ratio to a threshold to determine whether the score ratio is less than (or in some embodiments greater than) a threshold. By way of example only, a perfect matching score may be a larger number, such as 1,024. A fingerprint may still be a match even if the score is less than 1,024, and in multiple-touch scenarios, a valid touch event may have a score that is less than would be acceptable for a single touch event. Therefore, if the primary touch had an average score of 950 and the potential secondary touch had an average score of 600, the score ratio of the primary divided by the secondary would be equal to 1.58. A threshold, such as 1.9, may be set, such that if the score ratio is less than 1.9, the second touch would be determined to be a valid touch event. The score ratio is defined as having the larger number assigned to the numerator and the smaller number assigned to the denominator. Therefore, in some embodiments the score ratio would be the score of the secondary divided by the score of the primary. Note that if the score is defined to be zero for a perfect match and 1024 for no correlation (for example, a scaled version of the S' score defined above), the primary touch average score would instead be 1024−950=74 and the potential secondary touch average score would instead be 1024−600=424 and the ratio of these alternative scores would be 5.7. This illustrates that the use of a threshold such as 1.9 is tied to the choice of score definition and makes most sense for scores that are defined in such a way as to be proportional to the degree of correlation. The underlying concept is that the degrees of correlation do not differ by more than a threshold factor such as 1.9. It should be understood that different threshold factors may be used. Accordingly, if the primary touch had an average score of 950 and the potential secondary touch had an average score of 350, the score ratio would be 2.7, and the above-mentioned threshold criteria would not be met. It should be understood that other comparisons and thresholds may be used. In one embodiment, to meet the threshold criteria the average score (or degree of correlation) of the secondary touch needs to be at least one-half of the average score (or degree of correlation) of the primary touch.

If the score ratio does not meet the threshold criteria at 506, there is still only a single touch event, and the method returns to 500. If the score ratio does meet the threshold criteria, then a multiple touch state is occurring. The delayed reporting, in this example three frames after the second touch occurred, ensures that the second touch is a true touch event. At 508 the processor module 128 may report the coordinate locations to the operating system. The tracking of the multiple touches may be accomplished as discussed below. It should be understood that the identification and comparison of additional potential touch events is not limited to a second simultaneous touch event, but may be applied subsequently and/or simultaneously to additional potential touch events.

Figure 6:
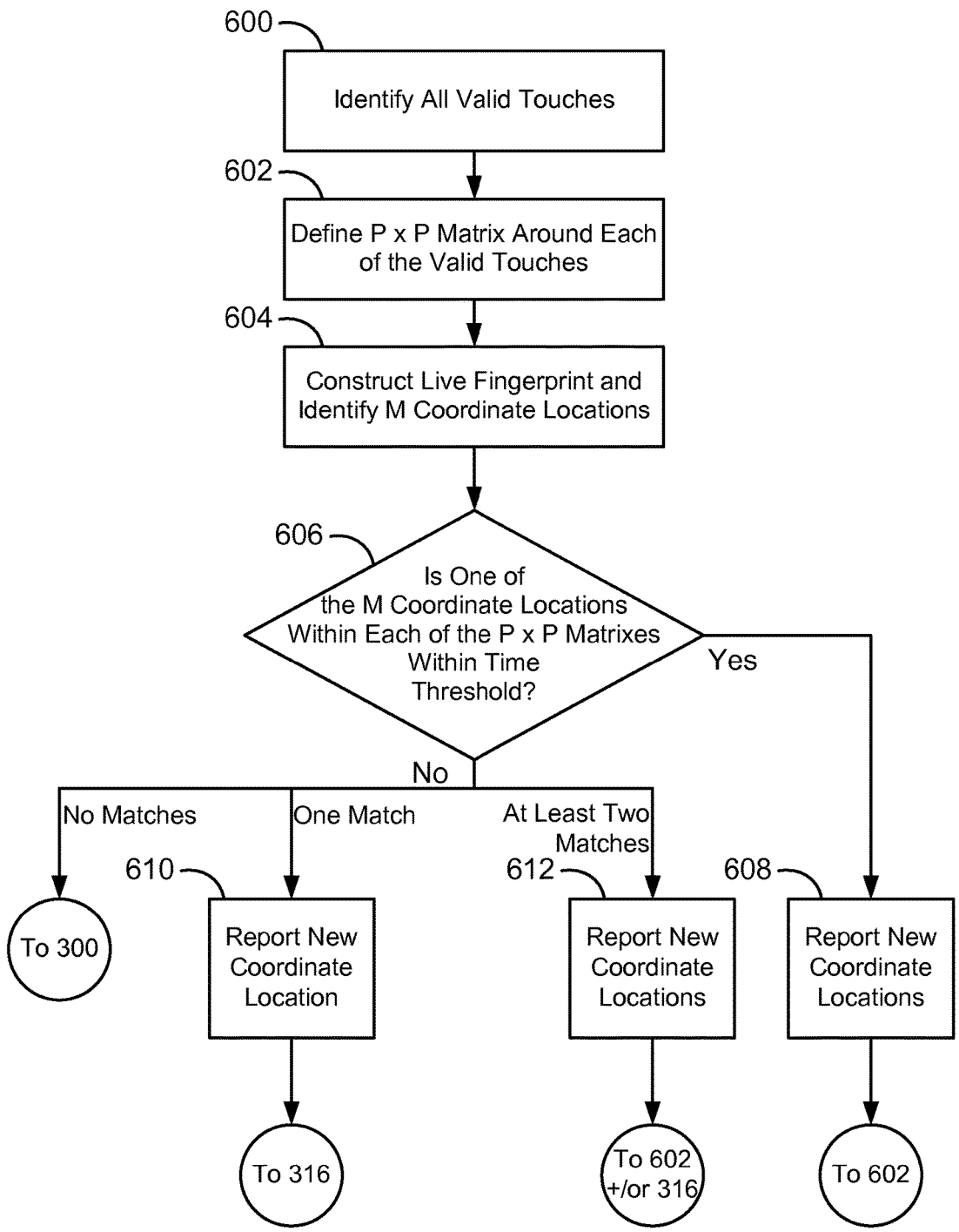
FIG. 6 illustrates a method for locally searching for candidate events proximate to confirmed touch events in accordance with an embodiment of the present invention.

Once a secondary or subsequent touch event has been identified and reported to the operating system, the processor module 128 may look for coordinate locations that are spatially near one of the identified touch events. This may ease the processing burden and potentially provide quicker response time for the user. FIG. 6 illustrates a method for locally searching for candidate events proximate to confirmed touch events. For example, the user may be accomplishing a gesture such as rotate or zoom, wherein two fingers (or other objects) are in contact with the touch panel 102 simultaneously. The user is going to move at least one of the touch points, but not so quickly that the processor module 128 cannot track the movement locally from frame to frame. In one embodiment, the processor module 128 will discontinue building the streams of FIG. 4B when locally searching. This may occur when the maximum number of expected simultaneous touches has been detected, such as two. In another embodiment, if additional simultaneous touches are allowed, the processor module 128 may continue to review all of the best matches and update the table 400, instead of or in addition to local searching.

At 600 the processor module 128 has identified the primary touch and one subsequent touch, such as a second touch corresponding to the stream 452. In some embodiments, there could be a third touch and/or more than three simultaneous touches. In the following example, two simultaneous touches are discussed.

At 602 the processor module 128 defines a proximate area, such as a P×P matrix, around each valid touch. The P×P matrices may each be 3×3 grid points, have a diameter of 24 mm or one inch, or other distance, with the coordinate location of the valid touch located in the middle. The size of the P×P matrix may be based on the size of the touch panel 102, sampling or frame rate time, the active application, defined by the user, and the like. The last identified coordinate location may be used. For example, if the last acquired frame of data corresponds to row 426 of FIG. 4B, then the coordinate locations stored in locations 472 and 475 would be used. In some embodiments the P×P matrix may be a square, but the shape and size are not limited to the embodiments disclosed herein.

At 604 the processor module 128 constructs a live fingerprint based on the next acquired frame of data (326 of FIG. 3) and identifies up to M coordinate locations (314-322 of FIG. 3). At 606, for each valid touch, the processor module 128 determines whether one of the M coordinate locations is within one of the P×P matrices within a time threshold. As discussed previously, the time threshold may be based on a number of frames, such as one frame or three frames. Other time thresholds may be used. If a best match is found within the time threshold within each of the P×P matrices, at 608 the processor module 128 reports the new coordinate locations of each touch point to the operating system. The method then returns to 602.

If a best match is not located within any of the P×P matrices at 606, the processor module 128 may return to 300 of FIG. 3. If a best match is located within one P×P matrix, at 610 the processor module 128 may report the new coordinate location of the single touch event to the operating system and return to 316 of FIG. 3. If each of the P×P matrices have an associated best match, such as when two or more valid touch events were identified at 600, at 612 the processor module 128 may report the new coordinate locations of the multiple touch events and return to 602 and/or 316. The processor module 128 may continue to search for additional touch events based on the capabilities of the system 100, the operating system, a particular application that is currently active, and the like.

Figure 7:
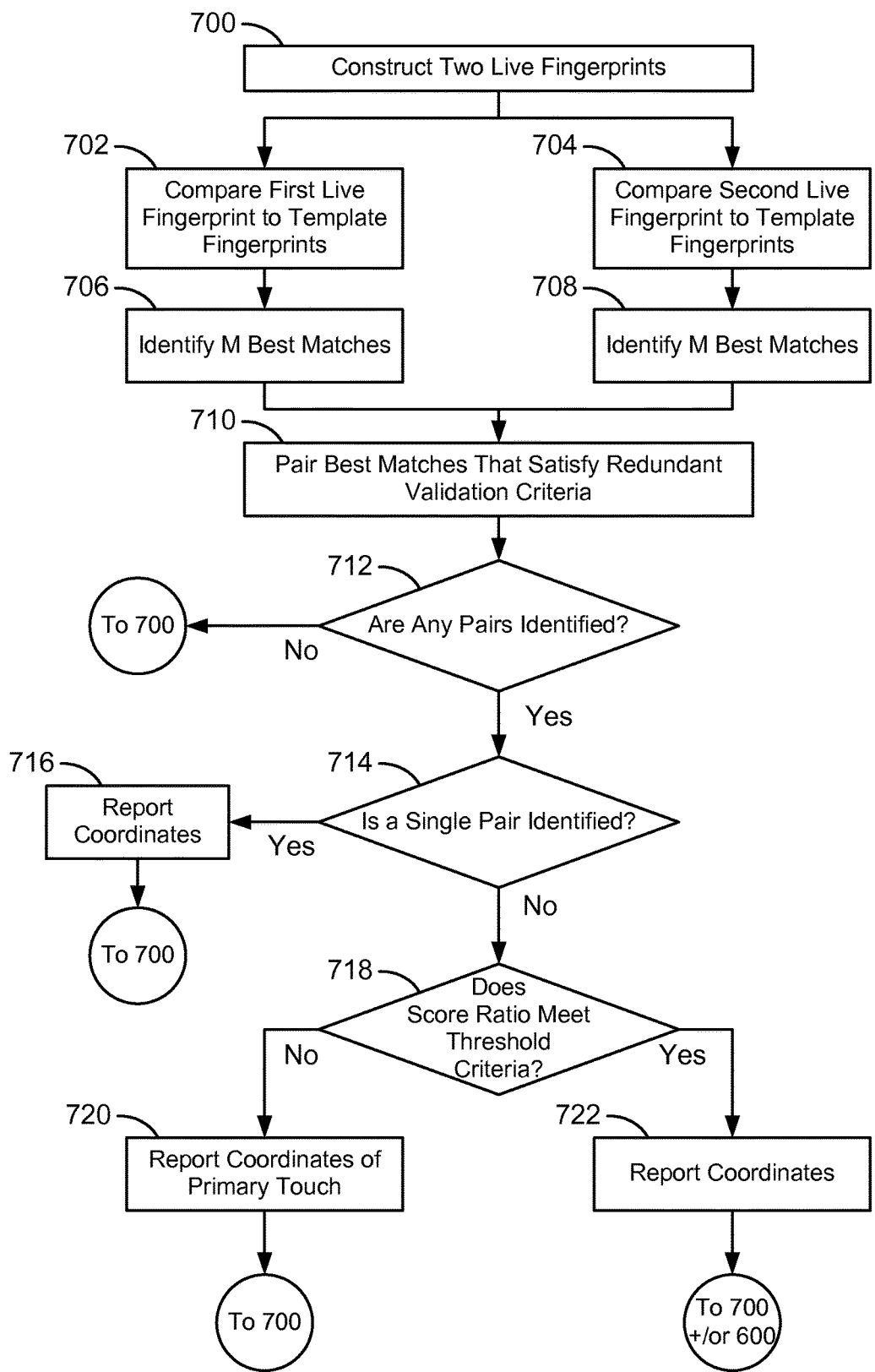
FIG. 7 illustrates another embodiment for detecting simultaneous touches using redundant validation in accordance with an embodiment of the present invention.

FIG. 7 illustrates an alternative embodiment for detecting simultaneous touches using redundant validation wherein two different acoustic fingerprints are generated based on the same frame of data. For example, the system 200 of FIG. 2 may be used wherein three sensors 204, 206 and 208 each produce a different signal. At 700, the processor module 128 constructs two live fingerprints based on the same frame of data. For example, a first live fingerprint may be constructed based on a phase difference profile between the sensors 204 and 206 and a second live fingerprint may be constructed based on a phase difference profile between the sensors 206 and 208. In another embodiment, two acoustic fingerprints may be constructed wherein one acoustic fingerprint is constructed using magnitude ratios and another acoustic fingerprint is constructed using phase differences. Other different acoustic fingerprint constructions and combinations may be used to construct one or both of the acoustic fingerprints. By using more than one acoustic fingerprint, the issue of noise sensitivity in small screens is better addressed. Also, more than two live fingerprints may be constructed. In general, a larger number of live fingerprints provides a higher degree of redundant information, and more opportunities to validate true touch coordinates and reject spurious touch coordinates using redundant validation algorithms. One way to provide for a larger number of live fingerprints is to add additional piezos to the sensor substrate, more piezo signal channels to the electronics and compute phase-difference and/or magnitude ratio profiles between the additional possible piezo signal pairs. For example, in FIG. 2, in addition to sensors 204, 206 and 208, an additional piezo or other sensor and electronic signal channel may be added. Depending on the needs of a particular application, the added cost and/or added computation load of such added piezos and electronic signal channels may be justified by improved multiple touch performance. This may be particularly true for applications that need to support three or more simultaneous touches.

At 702 the processor module 128 compares the first live fingerprint to template fingerprints, such as within the calibration file 138, and at 704 the processor module 128 compares the second live fingerprint to template fingerprints within a different calibration file, such as the calibration file 164.

At 706 and 708 the processor module 128 identifies M best matches for each of the first and second live fingerprints, respectively. At 710 the processor module 128 pairs best matches of the first live fingerprint with the best matches of the second live fingerprint based on redundant validation criteria. The redundant validation criteria may be, for example, a maximum distance between the coordinate locations of two best matches. The processor module 128 may thus compare the coordinate locations of each of the best matches associated with the first live fingerprint to the coordinate locations of each of the best matches associated with the second live fingerprint. If the distance between two coordinate locations is less than a distance threshold, the two best matches are paired. It should be understood that other redundant validations methods may be used.

At 712, if no pairs are identified, none of the matches are in the same vicinity and no touch is present on the touch panel 201. The method returns to 700. At 714, if a single pair is identified, then at 716 the processor module 128 reports the coordinates of the single touch event to the operating system if the score and/or degree of correlation meets the criteria of a single touch. The method returns to 700.

If more than one pair is identified, at 718 the processor module 128 compares a ratio of the average scores to a threshold to determine how similar the scores are to each other. Again, degree of correlation may be used rather than scores. The scores associated with the best matches of one pairing may be averaged and the scores associated with the best matches of the other pairing may be averaged. In one embodiment, the processor module 128 has already identified one primary touch, which is the first touch on the touch panel 201. This may occur as it is unlikely that a user will actually initiate touches on the touch panel 201 at two distinct positions during the same measuring time period, such as a single time frame, which may be 23 ms. As discussed previously, the scores of simultaneous touches may not be within the parameters used when identifying a single touch. In another embodiment, if a primary touch has not yet been identified, the pair that has the better score may be assigned to be the primary touch.

If the score ratio does not meet than the threshold criteria, then at 720 the processor module 128 identifies the primary touch as a single touch and reports the coordinates to the operating system. In some embodiments, the processor module 128 may only report the coordinates if the score and/or degree of correlation meets the criteria of a single touch. The method returns to 700. If the score ratio meets the threshold condition at 718, there is more than one touch present. At 722 the processor module 128 reports the coordinates of both of the pairs to the operating system. The method then may return to 700 to continue pairing best matches detected over the entire touch panel 201, and/or may conduct a local search based on distance thresholds from the identified coordinate locations, as in FIG. 6.

It should be understood that at 718 the processor module 128 may compare more than one pair to the primary touch. This may allow more than two simultaneous touches to be identified. Also, M may vary based on the application, the number of possible touches, and the like.

The method of FIG. 7 may additionally take into account frames that do not have data associated with a previously detected touch. For example, the processor module 128 may continue to report the presence of a primary touch for one, two or three frames even when the frames do not produce a pair of best matches that correspond to the primary touch. If a time threshold is exceeded, such as three empty frames, the processor module 128 may then stop reporting the coordinates of the primary touch. Similar processing may be applied to other simultaneous touches.

Because the methods of FIGS. 3 and 5-7 process the data that may have previously been used to detect only single touch events, algorithms, programs and the like may be provided as a downloadable program or any other type of software upgrade to expand a touch system 100, 200 to multiple touch capability without hardware modification. Alternatively, hardware modifications may be made to accomplish at least one of the multiple touch embodiments.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. This written description uses examples to disclose the invention, including the best mode, and also to enable any person skilled in the art to practice the invention, including making and using any devices or systems and performing any incorporated methods. While the dimensions and types of materials described herein are intended to define the parameters of the invention, they are by no means limiting and are exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

What is claimed is:

1. A method for determining touch events on a touch panel, the method comprising:
    identifying initial coordinate locations representative of the touch events based at least on template fingerprints, wherein a template fingerprint of the template fingerprints is an acoustic profile of a signal that represents a sound recognized when a coordinate location on the touch panel is touched, wherein the template fingerprint is established prior to the touch events, and wherein one of the initial coordinate locations corresponds to a primary touch event;
    identifying subsequent coordinate locations representative of the touch events based at least on the template fingerprints;
    gathering coordinate locations that are within a distance threshold to form groups of coordinate locations;
    identifying one or more secondary touch events that correspond to one or more of the groups with a predetermined number of coordinate locations identified within a predetermined period of time; and
    identifying a secondary touch event of the one or more secondary touch events based at least on a ratio between a score associated with the primary touch event and a score associated with the secondary touch event.

2. The method of claim 1, wherein the identifying the initial coordinate locations comprises:
    identifying the primary touch event as one of the initial coordinate locations that has a highest degree of correlation with one of the template fingerprints, the highest degree of correlation exceeding a predetermined degree of correlation;
    eliminating one or more of the initial coordinate locations that are within a predetermined distance of the primary touch event; and
    identifying additional initial coordinate locations representative of the touch events until a maximum number of coordinate locations is identified.

3. The method of claim 1, wherein the identifying the subsequent coordinate locations comprises:
    identifying a best match that corresponds to one of the subsequent coordinate locations with a highest degree of correlation with one of the template fingerprints;
    eliminating one or more of the subsequent coordinate locations that are within a predetermined distance of the best match; and
    identifying additional subsequent coordinate locations representative of the touch events until a maximum number of coordinate locations is identified.

4. The method of claim 1, wherein the initial and subsequent coordinate locations are identified from one or more signals from one or more sensors.

5. The method of claim 1, wherein the identifying the secondary touch event comprises:
    assigning a score to each of the initial and subsequent coordinate locations based at least on a degree of correlation with one of the template fingerprints;
    calculating a primary average score by averaging the scores associated with the initial and subsequent coordinate locations in a group that includes the primary touch event; and
    calculating a secondary average score by averaging the scores associated with the initial and subsequent coordinate locations in a group corresponding to the secondary touch event.

6. The method of claim 1, further comprising;
    identifying one or more new coordinate locations after identification of the primary touch event and the one or more secondary touch events.

7. The method of claim 1, wherein the predetermined number of coordinate locations is at least three.

8. A touch system, comprising:
    a touch panel;
    one or more sensors configured to generate one or more signals responsive to touch events on the touch panel; and
    a processor module configured to:
        identify initial coordinate locations representative of the touch events based at least on template fingerprints, wherein a template fingerprint of the template fingerprints is an acoustic profile of a signal that represents a sound recognized when a coordinate location on the touch panel is touched, wherein the template fingerprint is established prior to the touch events, wherein one of the initial coordinate locations corresponds to a primary touch event;
        identify subsequent coordinate locations representative of the touch events based at least on the template fingerprints;
        gather coordinate locations that are within a distance threshold to form groups of coordinate locations;
        identify one or more secondary touch events that correspond to one or more of the groups with a predetermined number of coordinate locations identified within a predetermined period of time; and
        identify a secondary touch event of the one or more secondary touch events based at least on a ratio between a score associated with the primary touch event and a score associated with the secondary touch event.

9. The touch system of claim 8, wherein the processor module is further configured to construct a fingerprint from the one or more signals based at least on a phase difference.

10. The touch system of claim 8, wherein the processor module is configured to identify the primary touch event as one of the initial coordinate locations that has a highest degree of correlation with one of the template fingerprints, the highest degree of correlation exceeding a predetermined degree of correlation.

11. The touch system of claim 8, wherein the processor module is further configured to eliminate initial and subsequent coordinate locations that are within a predetermined distance of the touch events.

12. The method of claim 1, further comprising:
eliminating one or more of the groups when one or more of the subsequent coordinate locations are excluded from the one or more of the groups.

13. The method of claim 1, further comprising:
reporting the initial coordinate location corresponding to the primary touch event to an operating system with substantially no delay.

14. The method of claim 1, further comprising:
associating, prior to the touch events, a coordinate position on the touch panel with one or more sensor signals generated when a known coordinate location is sensed;
processing the one or more sensor signals; and
storing a first result as a first template fingerprint of the template fingerprints.

15. The method of claim 14, further comprising:
processing the one or more sensor signals differently; and
storing a second result as a second template fingerprint, wherein the first template fingerprint and the second template fingerprint represent the coordinate position on the touch panel.

16. The method of claim 15, further comprising:
constructing a new template fingerprint based at least on the first template fingerprint and the second template fingerprint when the initial coordinate locations representative of the touch events are identified.

17. The method of claim 1, wherein the template fingerprints are based at least on a phase difference.

18. The touch system of claim 8, further comprising:
a memory, wherein the processor module is further configured to:
associate, prior to the touch events, a coordinate position on the touch panel with one or more sensor signals generated when a known coordinate location is sensed;
process the one or more sensor signals; and
store a first result as a first template fingerprint of the template fingerprints in the memory.

19. The touch system of claim 18, wherein the processor module is further configured to:
process the one or more sensor signals differently; and
store a second result as a second template fingerprint in the memory, wherein the first template fingerprint and the second template fingerprint represent the coordinate position on the touch panel.

20. The touch system of claim 19, wherein the processor module is further configured to:
construct a new template fingerprint based at least on the first template fingerprint and the second template fingerprint when the initial coordinate locations representative of the touch events are identified.

* * * * *